United States Patent [19]

Swanberg

[11] Patent Number: 5,175,636
[45] Date of Patent: Dec. 29, 1992

[54] SCANNER WITH A LINEARIZED PIXEL CLOCK

[75] Inventor: Melvin E. Swanberg, Claremont, Calif.

[73] Assignee: Olive Tree Technology, Inc., San Marino, Calif.

[21] Appl. No.: 535,743

[22] Filed: Jun. 8, 1990

[51] Int. Cl.$^5$ ............................................. H04N 1/04
[52] U.S. Cl. .................................. 358/474; 358/480; 358/481
[58] Field of Search ............... 358/480, 481, 199, 214, 358/474, 494; 250/235; 346/2, 109

[56] References Cited

U.S. PATENT DOCUMENTS

| | | | |
|---|---|---|---|
| 4,143,403 | 3/1979 | Ohnishi | 358/208 |
| 4,358,789 | 11/1982 | Confer | 358/208 |
| 4,386,271 | 5/1983 | Chiang et al. | 358/208 |
| 4,492,985 | 1/1985 | Sato et al. | 358/476 |
| 4,760,251 | 7/1988 | Shimada et al. | 358/493 |

Primary Examiner—Edward L. Coles, Sr.
Assistant Examiner—Thomas L. Stoll
Attorney, Agent, or Firm—Matthew F. Jodziewicz

[57] ABSTRACT

A scanner system includes a light source for producing a light beam and a director that directs the light beam to a spot on a surface to be scanned moving the spot across the surface along a scan line of predetermined length in a series of scan cycles. The scanner system has a pixel clock for producing a train of clock pulses during each of the scan cycles configured so that some of the clock pulses are spaced apart by a first time interval and others are spaced apart by a longer second time interval in order to maintain timing of the clock pulses according to spot position along the scan line in a manner that compensates for scanner non-linearity in order to reduce pixel position distortion. The pixel clock includes a reference clock for producing a train of reference pulses having a period such that at least M reference pulses occur during the time the spot moves from a first end of the scan line to a point along the scan line that is a distance from the first end of the scan line equal to L/N, where L is the length of the scan line, M is a predetermined integer, and N is a predetermined integral number of pixel positions along the scan line. The first time interval represents the occurrence of M reference pulses and the second time interval represents the occurrence of M+I reference pulses, where I is an integer.

4 Claims, 6 Drawing Sheets

SCANNER WITH A LINEARIZED PIXEL CLOCK

BACKGROUND OF THE INVENTION

1. Technical Field

This invention relates generally to input and output scanners, and more particularly to a scanner with a linearized pixel clock that compensates for scanner non-linearity.

2. Background Information

A scanner includes some type of scanning means for directing a light beam to a spot on a surface to be scanned. It does so in such a way that the spot moves across the surface along a scan line in a precisely controlled manner. That enables various input and output functions such as reading a document or printing a page.

Scanner non-linearity refers to variations in spot velocity occurring as the spot moves along the scan line. It is typically caused in such systems as polygon or galvanometer laser scanner systems by system geometry or a velocity variation of the scanning means and it can affect scanner performance. A scanner having a multifaceted rotating polygon, for example, directs the light beam at a constant angular velocity. But the spot is farther from the polygon facets at the ends of the scan line than it is at the center and so spot velocity increases as the spot moves from the center toward the ends. That can result in uneven pixel spacing along the scan line, a condition sometimes called pixel position distortion.

Some scanners compensate for scanner non-linearity electronically in order to reduce pixel position distortion using a linearized pixel clock. The pixel clock produces a pulse train that is used to turn the light beam on and off at each desired pixel position along the scan line, and it is said to be linearized in the sense that timing circuitry varies pulse timing according to spot position along the scan line and thereby according to spot velocity. That is done to at least partially compensate for scanner non-linearity in order to reduce pixel position distortion and produce more evenly spaced pixels.

Consider, for example, a scanner having a nine-inch scan line and a resolution of 300 dots-per-inch (dpi). That means there are 2700 pixel positions along the scan line. Ideally, the center-to-center spacing between any two adjacent pixel positions would be 1/300 inch so that they are evenly spaced. To accomplish that, each pulse in the pulse train must occur at just the right time to compensate for varying spot velocity. In other words, the time interval between each pulse and the following pulse must bear some defined relationship to spot position along the scan line and thereby spot velocity.

But it is difficult to produce such a pulse train. U.S Pat. No. 4,729,617, for example, describes a scanning clock generating device having a voltage controlled oscillator (VCO). Timing circuitry varies its frequency according to spot velocity using variable frequency division of a fixed oscillator to produce reference pulses that control the VCO. Somewhat complicated logic and frequency dependent componentry are involved, however. So it is desirable to have some other way of providing a linearized pixel clock.

Another problem concerns the variations in pixel exposure resulting from the variations in spot velocity. Sometimes referred to as pixel exposure distortion, it can result in objectionable variations in shade despite compensation for scanner non-linearity that reduces pixel position distortion. Although it is conceivable to vary the intensity of the light beam according to spot position along the scan line offset that effect, accurate intensity control may be difficult and expensive to achieve. Thus, it is desirable to have some other way to reduce unwanted variations in shade of the type described.

SUMMARY OF THE INVENTION

This invention solves the problems outlined above by providing a scanner with a pixel clock that produces a train of clock pulses using two different time intervals. The first time interval has a duration suitable for the ends of the scan line where spot velocity is the greatest, representing the time taken by the spot in moving from the first pixel position at the start of the scan line to the next pixel position. The second time interval is slightly longer and it is used at appropriate times throughout a -scan cycle to reduce the clock pulse timing error that accumulates from using the first time interval. That technique provides less complicated and less frequency dependent compensation for scanner non-linearity in order to reduce pixel position distortion. It can also provide a constant exposure interval that serves to reduce pixel exposure distortion.

To better visualize the technique employed, consider the spot as it moves pixel by pixel along the scan line. At the start of the scan line, spot velocity is the greatest and so the time interval between clock pulses needs to be relatively small for a given pixel spacing. But as the spot moves from the start of the scan line toward the center of the scan line, spot velocity decreases and so the interval between clock pulses needs to be somewhat longer for the same pixel spacing.

Ideally, the interval between subsequent clock pulses would steadily increase as the spot moves from the start of the scan line toward the center of the scan line, and then steadily decrease as the spot moves from the center to the end of the scan line. But using the first time interval departs from that ideal. It results in subsequent pulses occurring sooner than they should occur for evenly spaced pixel positions along the scan line, and that error accumulates from one clock pulse to the next.

So, when the clock pulse timing error accumulates sufficiently, the slightly longer second time interval is used as needed to reduce the error. Once the accumulated error is reduced, the first time interval is again used until the error once more accumulates sufficiently. Logic circuitry employs combinations of the two time intervals to produce timing of N clock pulses per scan cycle in a way that compensates for scanner non-linearity in order to reduce pixel position distortion. Of course, more than two time intervals may be employed within the inventive concepts disclosed.

In addition, the pixel clock may be configured to produce constant exposure timing for each pixel position. The constant exposure timing turns a constant intensity light beam on for the same time interval for each pixel position, and that produces uniform exposure from pixel to pixel. In other words, it compensates for scanner non-linearity in order to reduce pixel exposure distortion.

Generally, a scanner system constructed according to the invention includes a light source for producing a light beam and scanning means for directing the light beam to a spot on a surface to be scanned that is located at a predetermined location relative to the scanning means. That is done so that the spot moves across the surface along a scan line of predetermined length in a series of scan cycles. In addition, the system includes a pixel clock for producing a train of clock pulses during each of the scan cycles.

According to a major aspect of the invention, the pixel clock is configured so that some of the clock pulses are spaced apart by a first time interval and others are spaced apart by a longer second time interval in order to vary timing of the clock pulses according to spot position along the scan line in a manner that compensates for scanner non-linearity in order to reduce pixel position distortion. In that regard, the pixel clock may include means defining a reference clock for producing a train of reference pulses having a period such that at least M reference pulses occur during the time the spot moves from a first end of the scan line to a point along the scan line that is a distance from the first end of the scan line equal to L/N, where L is the length of the scan line, M is a predetermined integer, and N is a predetermined integral number of pixel positions along the scan line. The pixel clock is configured so that the first time interval represents the occurrence of M reference pulses and the second time interval represents the occurrence of M+I reference pulses, where I is an integer.

The pixel clock may be configured so that the first and second time intervals are the only time intervals by which the clock pulses are spaced apart during a scan cycle. In addition, the pixel clock may be configured so that the train of clock pulses includes different patterns or ratios of the first and second time intervals during each of a plurality of segments of each scan cycle. For example, the pixel clock may be configured so that the train of clock pulses includes only the first time interval during a first segment of the scan cycle, both the first and second time intervals in a first predetermined ratio during a second segment of the scan cycle, and both the first and second time intervals in a second predetermined ratio during a third segment of the scan cycle. Of course, more than two predetermined ratios and more than three segments of the scan cycle may be employed within the inventive concepts disclosed.

In the case of a scanner having a nine inch scan line, for example, the pixel clock may be configured to produce 2700 clock pulses during each of the scan cycles in order to control the light beam at 2700 pixel positions along the scan line (a resolution of 300 dpi). The means for producing a train of reference pulses may be configured so that at least 10 reference pulses occur during the time it takes for the spot to move along the scan line from a first end of the scan line approximately 1/300 inch (the pixel spacing corresponding to 300 dpi). In addition, the pixel clock may be configured so that the first time interval represents the occurrence of 10 reference pulses and the second time interval represents the occurrence of 11 reference pulses, and the first and second time intervals may be used in different predetermined ratios for three different segments of each scan cycle.

Furthermore, the pixel clock may be configured to compensate for scanner non-linearity in order to reduce pixel exposure distortion. For that purpose, the pixel clock may include circuitry for producing a constant exposure period to be used at each pixel position. It may include, for example, circuitry for producing a train of constant width pulses that are no longer than the shortest pixel period, although they may be shorter. Moreover, the pixel clock may include control circuitry for dynamically varying the constant pulse width in order to vary the exposure.

From a different perspective, a scanner system constructed according to the invention includes means defining a reference clock for producing a train of reference pulses. The system also includes means responsive to the reference clock for producing a train of N clock pulses during each of the scan cycles so that some of the clock pulses are spaced apart by a first time interval representing the occurrence of M reference pulses and other ones of the clock pulses are spaced apart by a second time interval representing the occurrence of M+I reference pulses. The first and second time intervals are used in combinations such that timing of the clock pulses varies according to spot position along the scan line in a manner compensating for scanner non-linearity in order to reduce pixel position distortion.

More particularly, the system may include means defining a counter responsive to the reference pulses for producing a train of clock pulses, which counter is configured to operate in a selected one of a first mode of counter operation in which the counter produces one of the clock pulses for each occurrence of M reference pulses and in a second mode of counter operation in which the counter produces one of the clock pulses for each occurrence of M+I reference pulses. The mode of counter operation is selected according to the position of the spot along the scan line so that some of the clock pulses are spaced apart by a first time interval representing the occurrence of M reference pulses and other ones of the clock pulses are spaced apart by a second time interval representing the occurrence of M+I reference pulses, and that is done in a manner such that the timing of the clock pulses compensates for scanner non-linearity in order to reduce pixel position distortion.

In line with the above, there is provided a method of compensating for scanner non-linearity in order to reduce pixel position distortion in a scanner system having a light source for producing a light beam and scanning means for directing the light beam to a spot on a surface to be scanned that is located at a predetermined location relative to the scanning means and for moving the spot across the surface along a scan line of predetermined length in a series of scan cycles. The method includes the step of producing a train of reference pulses having a period such that at least M reference pulses occur during the time it takes for the spot to move along the scan line from a first end of the scan line a distance equal to L/N, where L is the length of the scan line and M and N are predetermined integers, N being a predetermined number of pixel positions along the scan line. The method also includes the step of providing a counter responsive to the reference pulses for producing a train of N clock pulses, which counter is configured to operate in a selected one of a first mode of counter operation in which the counter produces one of the N clock pulses for each occurrence of M reference pulses and in a second mode of counter operation in which the counter produces one of the N clock pulses for each occurrence of M+I reference pulses, where I is a predetermined integer. The method proceeds by selecting the mode of counter operation according to spot position along the scan line in order to produce timing of the N clock pulses that compensates for scanner non-linearity in order to reduce pixel position distortion.

The step of selecting the mode of counter operation may include the step of selecting the first and second modes of counter operation for each of a plurality of segments of each of the scan cycles so that the pulse train includes different ratios of the first and second intervals for each of the segments. In addition, the step of selecting the mode of counter operation may include selecting only the first mode of counter operation during a first segment of each of the scan cycles, both the first and second modes of counter operation in a first predetermined ratio during a second segment of each of the scan cycles, and both the first and second modes of counter operation in a second predetermined ratio during a third segment of each of the scan cycles.

DESCRIPTION OF THE PREFERRED EMBODIMENT

Figure 1:
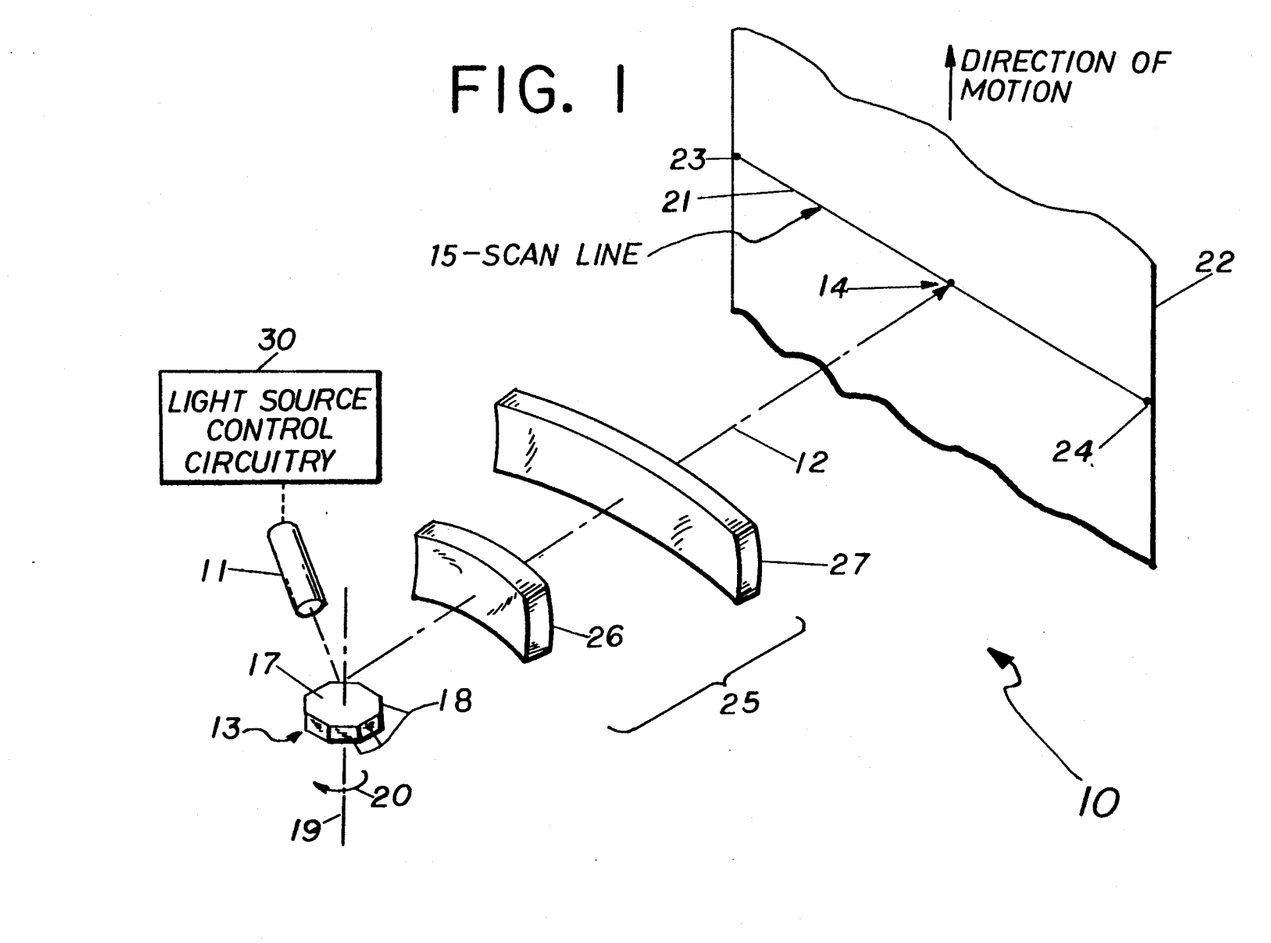
FIG. 1 of the drawings is a diagrammatic representation of a scanner constructed according to the invention.

FIG. 1 illustrates a scanner system 10 constructed according to the invention. Generally, the scanner system 10 includes a light source 11 for generating a light beam 12 and scanning means 13 for directing the light beam 12 to a spot 14 at a predetermined location relative to the scanning means 13. The scanning means 13 also serves to move the spot 14 along a scan line 15 of specified length at the predetermined location. For that purpose, the scanning means 13 in the illustrated scanner system 10 includes a rotatable element or polygon 17 with a plurality of light reflecting facets 18 (eight facets being illustrated) and other known mechanical components that are depicted in FIG. 1 by the polygon 17 rotating about a rotational axis 19 in the direction of an arrow 20.

As the polygon 17 rotates, the light beam 12 is directed by the facets 18 toward an image plane at a surface 21 to be scanned, such as the surface of a photoreceptor 22, scanning across the surface 21 in a known manner along the scan line 15 from a first end 23 of the scan line 15 past a center (the illustrated position of the spot 14) and on to a second end 24 of the scan line 15. Thus, the light beam 12 scans in a scan plane defined as a plane containing both the scan line 15 and a central light beam position that is the position occupied by the light beam 12 when it is directed toward the center of the scan line 15 (i.e., the position of the light beam 12 that is illustrated in FIG. 1).

Those components may be similar in many respects to corresponding components of existing scanner systems and the scanner system 10 may include a post-facet lens system 25 having first and second elements 26 and 27 that compensate for field curvature and wobble. Of course, the post-facet lens system 25 may be omitted without departing from the inventive concepts disclosed. In addition, the light source 11 may include a known type of infrared laser diode and known conditioning optics. It forms a beam at the facets 18 that is collimated in the scan plane and focused in the cross-scan plane. Of course, any of various light sources may be employed without departing from the inventive concepts disclosed, however.

A major way the scanner system 10 differs from existing designs is in having light source control circuitry 30 as subsequently described with reference to FIGS. 1-5. It serves to control the light beam 12 in order to produce a plurality of pixels on the surface along the scan line 15. For that purpose, the circuitry 30 may be configured in some respects according to known techniques, including known start of scan (SOS) detection circuitry, for example, that is configured to produce an SOS signal each time the light beam starts a scan cycle. But according to a major aspect, it is configured to include a linearized pixel clock that compensates for the pixel position distortion resulting from scanner non-linearity, such as the pixel clock 31 illustrated in block diagram form in FIG. 2.

Figure 2:
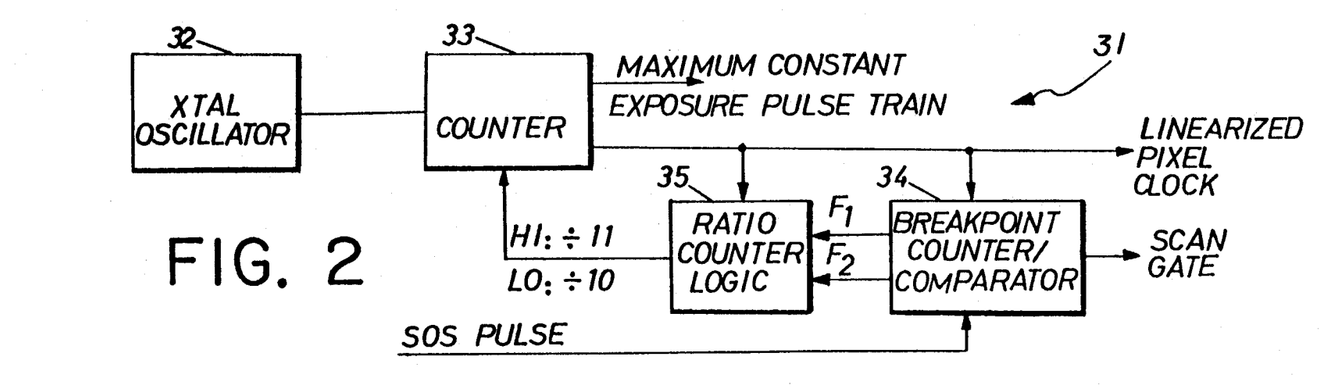
FIG. 2 is a block diagram of the pixel clock circuitry.

The pixel clock 31 serves as means for producing a train of clock pulses during each of the scan cycles. It is configured so that some of the clock pulses are spaced apart by a first time interval and others are spaced apart by a longer second time interval in the usual sense that it is so constructed and arranged that the leading edges of the clock pulses are spaced apart by those time intervals. That is done in order to maintain timing of the clock pulses according to spot position along the scan line in a manner that compensates for the pixel position distortion resulting from scanner non-linearity in the sense that it at least partially compensates for such pixel position distortion. In other words, "compensating for the pixel position distortion resulting from scanner non-linearity" includes at least partially compensating for such pixel position distortion.

Linearization is accomplished by varying the ratio of the first and second time intervals in a way resulting in more even pixel spacing. For that purpose, the pixel clock 31 includes a reference clock 32, such as a crystal oscillator, that serves as means for producing a train of reference pulses. The frequency of the oscillator is some predetermined multiple of the maximum pixel clock frequency required for the greatest spot velocity (i.e., the spot velocity occurring at the ends 23 and 24 of the scan line 15). In other words, the period of the train of pulses is such that at least M reference pulses occur during the time the spot moves one pixel position beyond the first end 23 of the scan line. More particularly, that is the time it takes for the spot to move from the first end 23 of the scan line 15 to a point along the scan line that is a distance from the first end 23 of the scan line equal to L/N, where L is the length of the scan line, M is a predetermined integer, and N is a predetermined integral number of pixel positions along the scan line.

The pixel clock 31 also includes a programmable counter 33. It serves as means responsive to the reference clock for producing a train of N clock pulses during each of the scan cycles. To do so, it counts the reference pulses in one of two modes of counter operation. In the first mode it counts M reference pulses to result in the clock pulses being spaced apart by a first time interval representing the occurrence of M reference pulses. In the second mode of counter operation it counts M+I clock pulses to result in the clock pulses being spaced apart by a second time interval representing the occurrence of M+I reference pulses, I being a predetermined integers. For the illustrated pixel clock 31, M is ten and I is one. Thus, the counter 33 produces one of the N clock pulses for every ten reference pulses in the first mode of counter operation while it produces one of the N clock pulses for every eleven reference pulses in the second mode of counter operation.

The pixel clock 31 also includes means for causing the first and second time intervals to occur in combinations such that timing of the clock pulses varies according to spot position along the scan line in a manner compensating for the pixel position distortion resulting from scanner non-linearity. That is accomplished in the illustrated embodiment with logic circuitry responsive to the output of the pixel clock 31 (i.e, the train of clock pulses it produces).

Logic circuitry could be used to briefly switch the counter 33 to the second mode whenever the accumulated pulse timing error is such that a clock pulse occurs one-half a reference pulse time period too soon for even pixel spacing. That could be done in order produce just one of the longer second time intervals in order to reduce the accumulated error and thereby always keep clock pulse timing within $\pm \frac{1}{2}$ reference pulse period of even pixel spacing. But to avoid the relatively complex logic required, the illustrated pixel clock 31 divides each of the scan cycles into a plurality of scan segments and uses suitable ratios of first and second time intervals during each of the scan segments to maintain clock pulse timing within desired limits.

Thus, the pixel clock 31 includes a breakpoint counter/comparator 34 that serves as means responsive to the clock pulses for producing an output representing the occurrence of each of a plurality of segments of the scan cycle. To do so, it counts clock pulses from the start of each scan cycle as indicated by a start of scan pulse (SOS pulse) derived by suitable known means such as a known SOS detector that may be included as part of the circuitry 30 in FIG. 1. Ratio counter logic 35 responsive to the output of the breakpoint counter/comparator 34 switches the counter 33 between the first and second modes of operation according to the scan segment. It serves as means responsive to the comparator for selecting the first and second modes of counter operation for each of the scan segments so that the pulse train includes a predetermined ratio of the first and second intervals for each of the scan segments.

For illustrative purposes, the pixel clock 31 is configured for a scan line having a nine inch length and for a resolution of 300 dpi, corresponding to 2700 pixel positions at 1/300 inch intervals along the scan line, so that the pixel clock produces a train of 2700 clock pulses for each scan cycle. In addition, the breakpoint counter/comparator 34 is configured to divide each scan cycle into three scan segments. The first scan segment includes first and second portions, the first portion including clock pulses 1-315 and the second portion including clock pulses 2386-2700. The second scan segment includes first and second portions, the first portion including clock pulses 316-750 and the second portion including clock pulses 1951-2385, and the third segment of each of the scan cycles includes clock pulses 751-1950. For the first segment, only the first time interval is used. For the second scan segment, the ratio counter logic 35 switches between the first and second modes of counter operation to produce a ratio of first time intervals to second time intervals of 5:2, and for the third scan segment, it switches to produce a ratio of 1:1.

Figure 3:
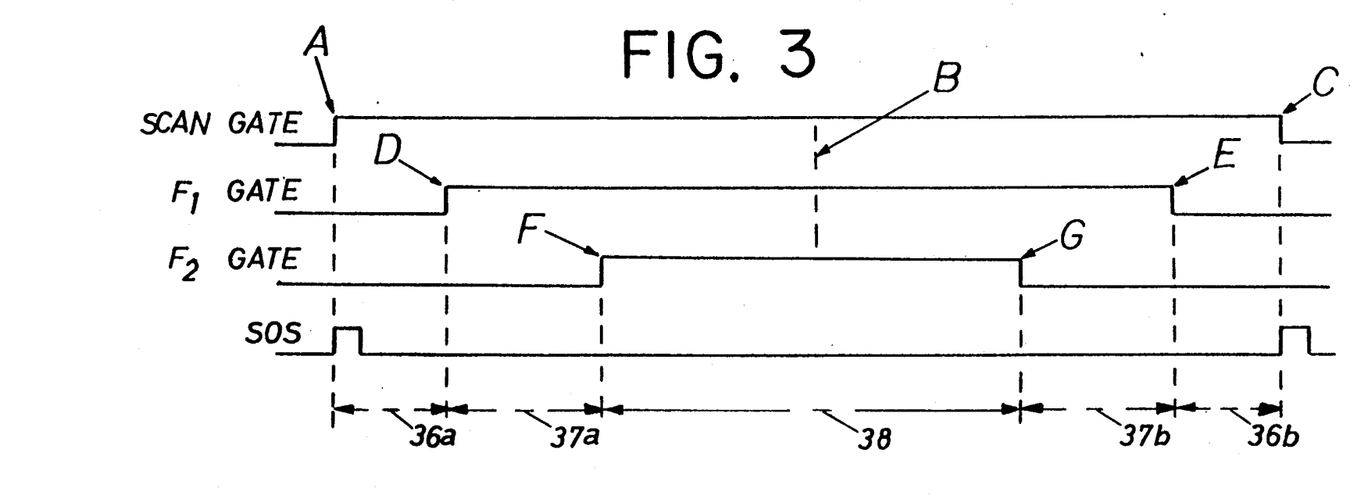
FIG. 3 is a timing diagram of various waveforms of the pixel clock circuitry.

FIG. 3 is a timing diagram showing the gate waveforms. The SCAN GATE signal goes high at the start of a scan cycle (breakpoint A in FIG. 3), the leading edge of the SOS signal and of clock pulse 1. For a nine inch scan line, that is 4.5 inches before the center of the scan line (designated by the broken line at B in FIG. 3). The SCAN GATE remains high until the end of the scan cycle, 4.5 inches beyond the center of the scan line and the leading edge of clock pulse 2700 (breakpoint C).

The $F_1$ GATE signal remains low until the leading edge of the clock pulse 315 where it goes high (breakpoint D), 3.45 inches before the center of the scan line. It remains high until the leading edge of clock pulse 2385 where it goes low (breakpoint E), 3.45 inches beyond the center of the scan line. The $F_2$ GATE signal remains low until the leading edge of clock pulse 750 where it goes high (breakpoint F), 2.00 inches before the center of the scan line. It remains high until the leading edge of clock pulse 1950 where it goes low (breakpoint G), 2.00 inches beyond the center of the scan line.

Thus, for the illustrated case of a nine inch scan line, the first and second portions 36a and 36b of the first scan segment are each 1.05 inches and 315 clock pulses or pixels long. Similarly, the first and second portions 37a and 37b of the second scan segment are each 1.45 inches and 435 clock pulses or pixels long, and the third scan segment 38 is 4.00 inches and 1200 clock pulses or pixels long.

Figure 4A:
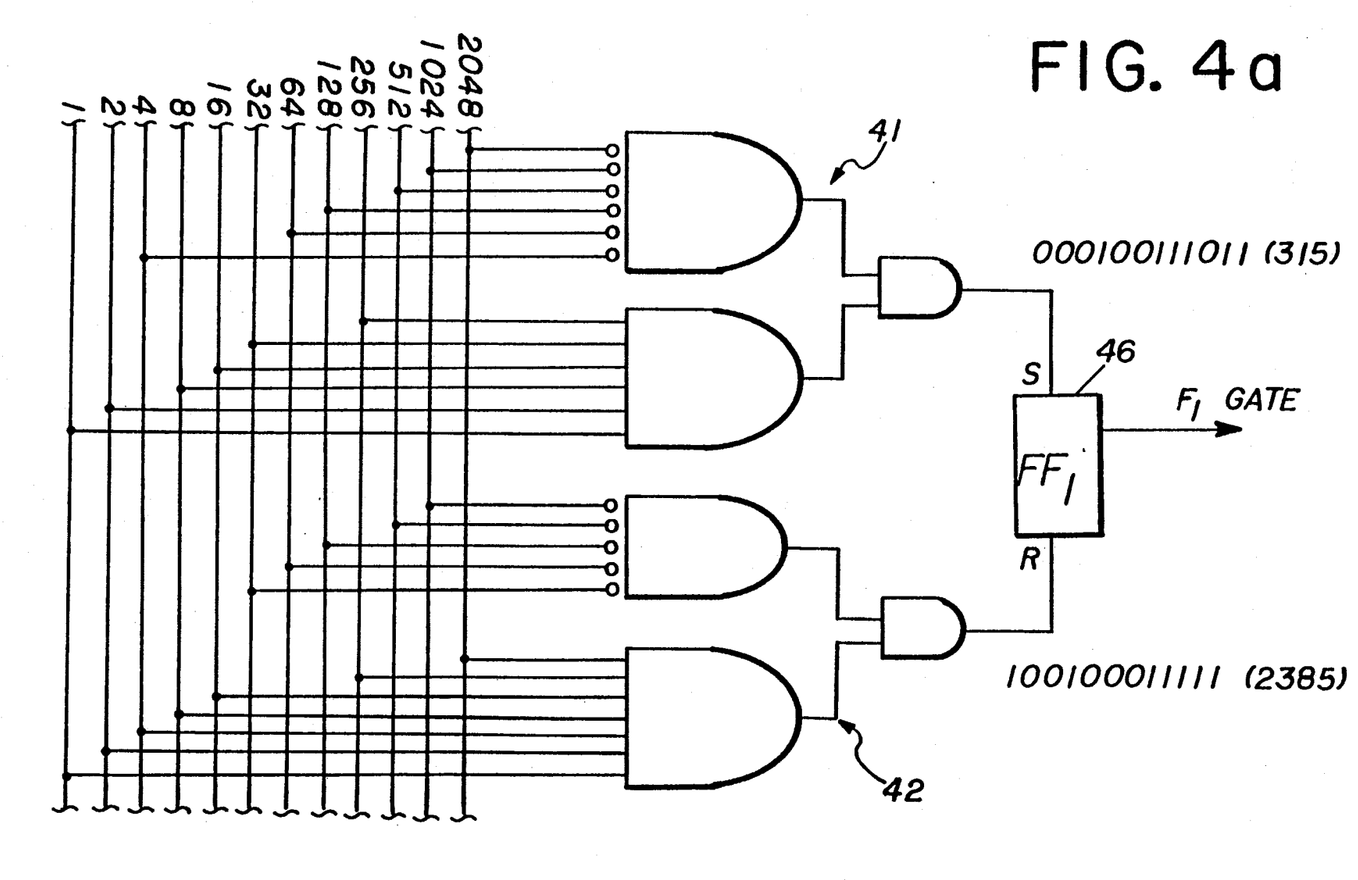
FIG. 4a-4c is a schematic circuit diagram of the breakpoint counter/comparator circuitry.
Figure 4B:
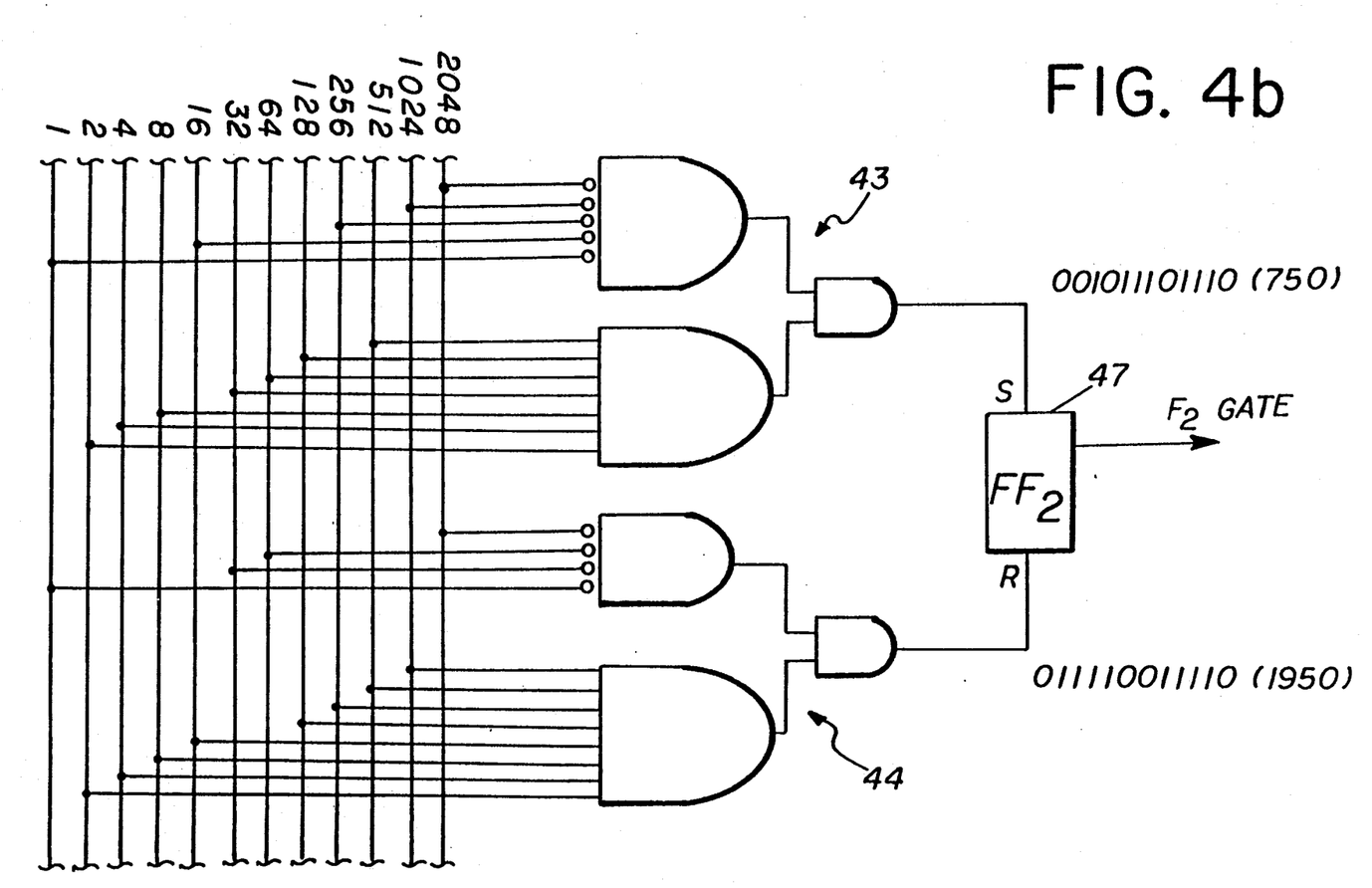
Figure 4C:
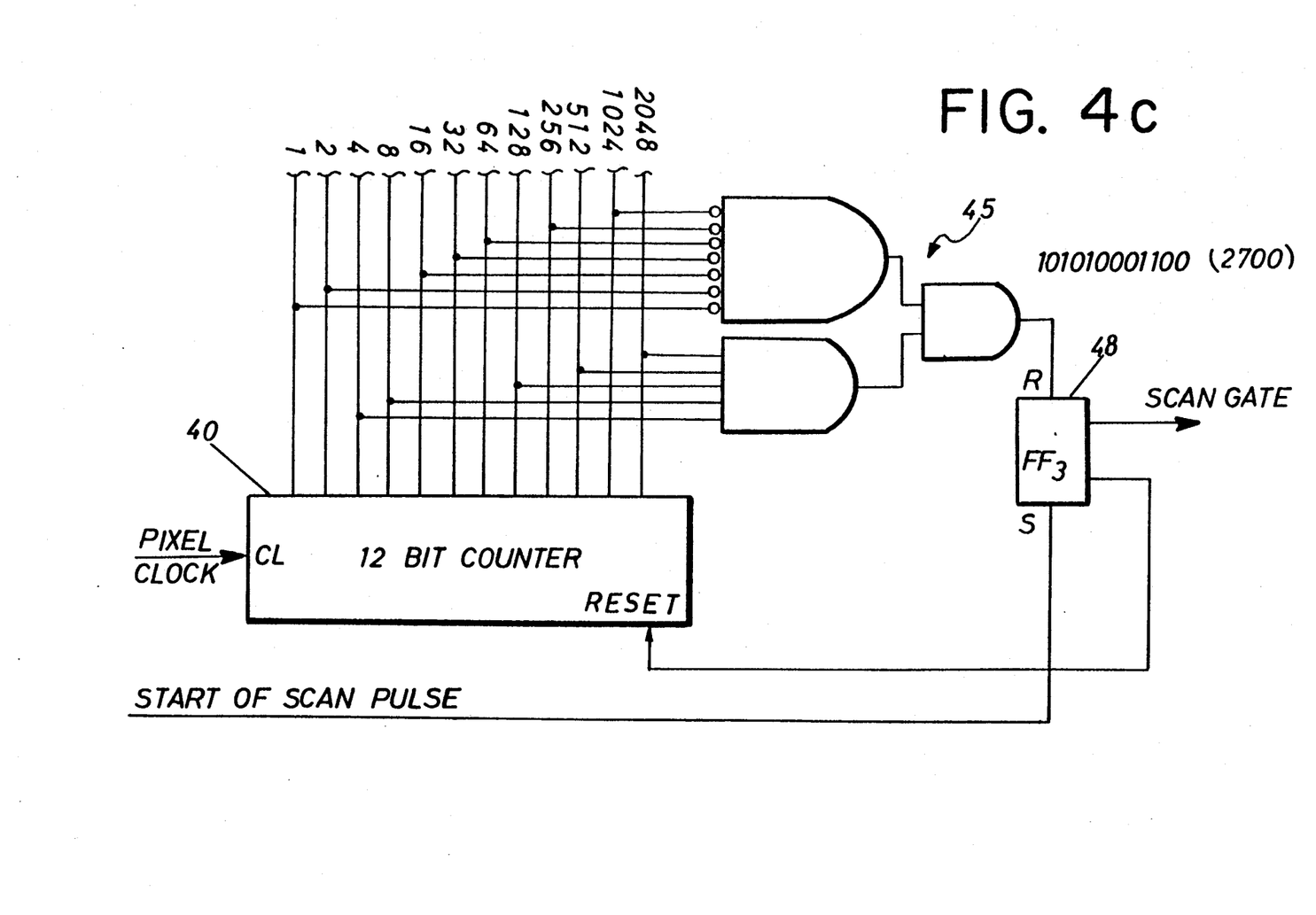

Further details of the counter/comparator 34 are shown in FIGS. 4a-4c. A 12-bit counter 40, five 12-bit comparators 41-45, and three flip flops 46-48 combine as shown to produce the SCAN GATE, $F_1$ GATE, and $F_2$ GATE signals. The flip flop 48 is set by the SOS pulse and in turn releases the reset on the 12-bit counter 40. At the appropriate count of clock pulses, the outputs of the comparators 41-45 set and reset the flip flops 46 and 47, ending the cycle with the reset of the flip flop 48. The flip flop 48 in turn resets the counter 40 to zero and awaits the next SOS pulse.

Figure 5:
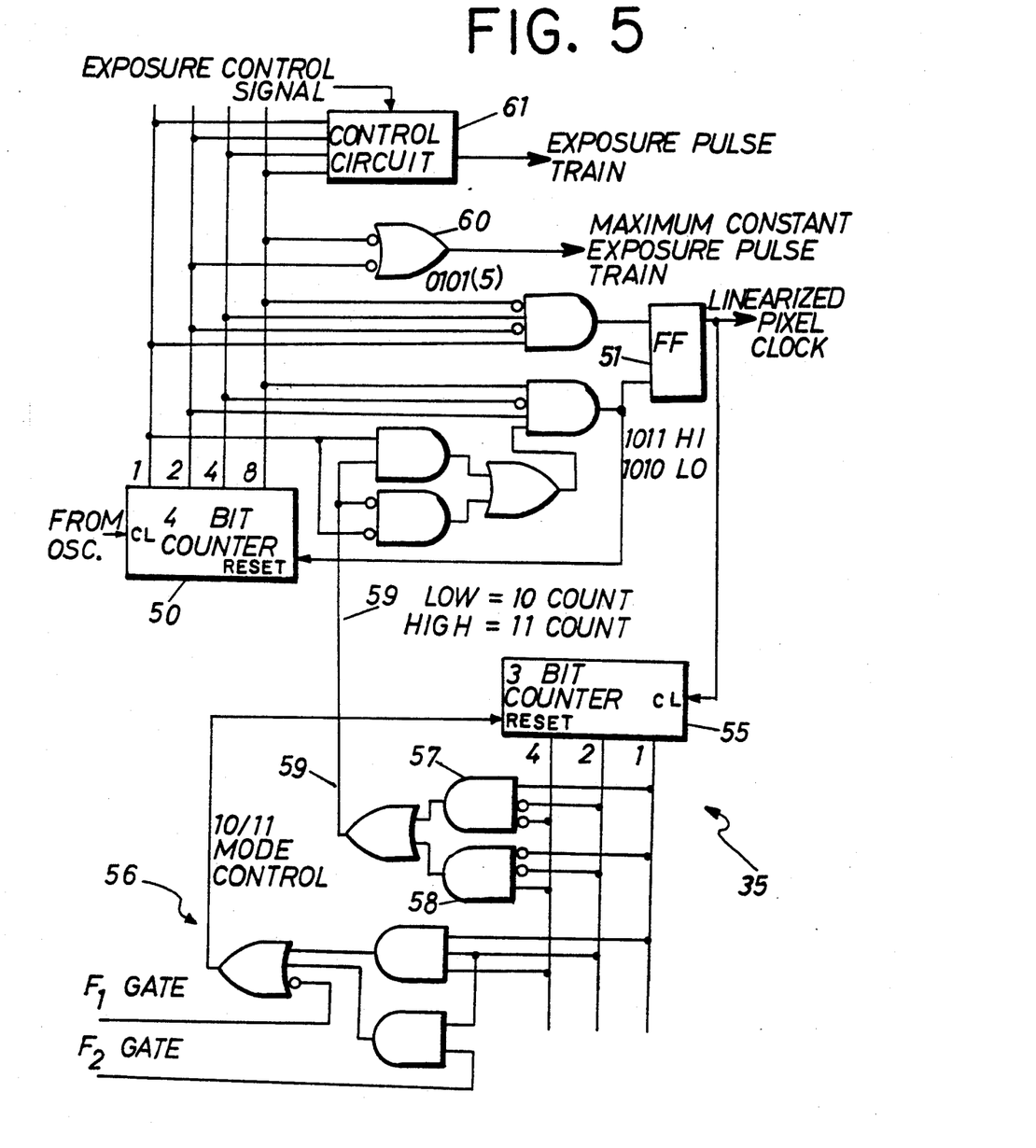
FIG. 5 is a schematic circuit diagram of the ratio counter logic.

The foregoing illustrates function and not any particular componentry. FIG. 5 does so for the counter 33 and the ratio counter logic 35, configured for illustrative purposes to count either ten or eleven reference pulses (i.e., M=10 and I=1). A 4-bit counter 50 is reset to zero at the count of ten or eleven, depending on the state of the input from the ratio counter logic 35. The signal from the ratio counter logic 35 to the counter 33 being in a LOW state (line 59 in FIG. 5) causes the reset of the counter 50 at a count of ten, and being in a HIGH state causes a reset of the counter 50 at the count of eleven. The output flip flop 51 is also reset at this time, having been set at a count of five, a count which provides a near symmetrical square wave output from flip flop 51.

The ratio counter logic 35 includes a 3-bit counter 55, reset logic 56, and two comparators 57 and 58 that provide a HIGH output at the count of one and four. A LOW condition on the $F_1$ GATE input line holds the counter reset to zero so that the counter 33 remains in the first mode of operation (i.e., 10 reference pulses per clock pulse). With $F_1$ HIGH and $F_2$ LOW, the ratio counter logic 35 advances on each clock pulse and is reset to zero on reaching a count of seven. The outputs of the comparators 57 and 58, and thus the mode of operation input on line 59, are HIGH at the counts of one and four and LOW at the counts of 0, 2, 3, 5, and 6, thus providing the ratio of 5:2 of shorter first time intervals to longer second time intervals. With both $F_1$ and $F_2$ HIGH, the 3-bit counter 55 is reset to zero at the count of two, thus having only the two states zero and one. In that case, the mode of operation input on line 59 is HIGH and LOW for alternate clock pulses, thus providing a first to second time interval ratio of 1:1.

Thus, the invention provides a scanner with a pixel clock that produces a train of clock pulses using two different time intervals, a first time interval having a duration suitable for the ends of the scan line where spot velocity is the greatest and a second time interval that is slightly longer in order to reduce the clock pulse timing error that accumulates from using the first time interval. Less complicated logic and less frequency dependent componentry results.

In addition, the pixel clock may be configured to compensate for scanner non-linearity in order to reduce pixel exposure distortion. For that purpose, the pixel clock may include circuitry (such as the OR gate circuitry 60 in FIG. 5) for producing a constant exposure period to be used at each pixel position. The OR gate circuitry 60 may, for example, be configured to produce a train of constant width pulses that are no longer than the shortest pixel period, although they may be shorter. The pulse width is used in a known way to determine the maximum exposure period for each pixel position. In addition, the pixel clock may include control circuitry 61 for dynamically varying the constant pulse width in order to vary the exposure.

Although an exemplary embodiment of the invention has been shown and described, many changes, modifications, and substitutions may be made by one having ordinary skill in the art without necessarily departing from the spirit and scope of the invention. Various types of oscillators may be employed instead of the illustrated crystal oscillator 32, for example, such as a VCO in a SOS/EOS phase locked loop or one utilizing other known oscillator stabilizing techniques such as those described in U.S. Pat. No. 4,268,867.

What is claimed is:

1. A scanner system, comprising:

means defining a light source for producing a light beam;

scanning means for directing the light beam to a spot on a surface to be scanned that is located at a predetermined location relative to the scanning means and for moving the spot across the surface along a scan line of predetermined length in a series of scan cycles;

means defining a pixel clock circuit for producing a train of clock pulses during each of the scan cycles, which pixel clock is configured so that some of the clock pulses are spaced apart by a first time interval and others are spaced apart by a longer second time in order to maintain timing of the clock pulses according to the spot position along the scan line in a manner that compensates for scanner non-linearity in order to reduce pixel position distortion, the pixel clock further including means defining a reference clock for producing a train of reference pulses having a period such that at least M reference pulses occur during the time the spot moves from a first end of the scan line to a point along the scan line that is a distance from the first end of the scan line equal to L/N, where L is the length of the scan line, M is a predetermined integer, and N is a predetermined integral number of pixel positions along the scan line, the pixel clock being configured so that the first time interval represents the occurrence of M reference pulses and the second time interval represents the occurrence of M+I reference pulses, where I is an integer, and the first and second time intervals are the only time intervals by which the clock pulses are spaced apart during a scan cycle.

2. A scanner system, comprising:

means defining a light source for producing a light beam;

scanning means for directing the light beam to a spot on a surface to be scanner that is located at a predetermined location relative to the scanning means and for moving the spot across the surface along a scan line of predetermined length in a series of scan cycles;

means for producing a train of reference pulses having a period such that at least M reference pulses occur during the time it takes for the spot to move along the scan line from a first end of the scan line and M and N are predetermined integers, N being a predetermined number of pixel positions along the scan line;

means defining a counter responsive to the reference pulses for producing a train of clock pulses, which counter is configured to operate in a selected one of a first mode of counter operation in which the counter produces one of the clock pulses for each occurrence of M reference pulses and in a second mode of counter operation in which the counter produces one of the clock pulses for each occurrence of M+I reference pulses, where I is a predetermined integer; and means for selecting the mode of counter operation according to the position of the split along the scan line so that some of the clock pulses are spaced apart by a first time interval representing the occurrence of M reference pulses and other ones of the clock pulses are spaced apart by a second time interval representing the occurrence of M+I reference pulses in a manner such that the timing of the clock pulses compensates for scanner non-linearity in order to reduce pixel position distortion, the means for selecting the mode of counter operation being configured to segment each scan cycle into first, second, and third scan segments, to select the first mode of counter operation during the occurrence of the first scan segment, to select both the first and second modes of counter operation in a predetermined ratio during the occurrence of the second scan segment, and to select both the first and second modes of counter operation in another predetermined ratio during the occurrence of the third scan segment the means for selecting the mode of counter operation further includes:

means defining a comparator responsive to the clock pulses for producing an output representing the occurrence of each of a plurality of segments of the scan cycle; and means responsive to the comparator for selecting the first and second modes of counter operation for each of the scan segments so that the pulse train includes a predetermined ratio of the first and second intervals for each of the scan segments.

3. A method of compensating for scanner non-linearity in order to reduce pixel position distortion in a scanner system having a light source for producing a light beam and scanning means for directing the light beam to a spot on a surface to be scanned that is located at a predetermined location relative to the scanning means and for moving the spot across the surface along a scan line of predetermined length in a series of scan cycles, the method comprising:

producing a train of reference pulses having a period such that at least M reference pulses occur during the time it takes for the spot to move along the scan line from a first end of the scan line and M and N are predetermined integers, N being a predetermined number of pixel positions along the scan line;

providing a counter responsive to the reference pulses for producing a train of N clock pulses, which counter is configured to operate in a selected one of a first mode of counter operation in which the counter produces one of the N clock pulses for each occurrence of M reference pulses and in a second mode of counter operation in which the counter produces one of the N clock pulses for each occurrence of M+I reference pulses, where I is a predetermined integer; and selecting the mode of counter operation according to spot position along the scan line in order to produce timing of the N clock pulses that compensates for scanner non-linearity in order to reduce pixel position distortion, the step of selecting the mode of counter operation further including selecting only the first mode of counter operation during a first segment of each of the scan cycles, both the first and second modes of counter operation in a first predetermined ratio during a second segment of each of the scan cycles, and both the first and second modes of counter operation in a second predetermined ratio during a third segment of each of the scan cycles.

4. A method as recited in claim 5, wherein:

M is 10, N is 2700, I is 1, and L is approximately nine inches;

the first segment of each of the scan cycles includes approximately clock pulses 1-315 and clock pulses 2386-2700;

the second segment of each of the scan cycles includes approximately clock pulses 316-750 and clock pulses 1951-2385;

the third segment of each of the scan cycles includes approximately clock pulses 751-1950;

the first predetermined ratio of the first interval to the second interval is 5:2, and, the second predetermined ratio of the first interval to the second interval is 1:1.

* * * * *